US006266029B1

(12) United States Patent
Lee et al.

(10) Patent No.: US 6,266,029 B1

(45) Date of Patent: Jul. 24, 2001

(54) LUNEBERG LENS ANTENNA WITH MULTIPLE GIMBALED RF FEEDS

(75) Inventors: Chang Sob Lee, Moorpark; Mark Edward Rayner, Simi Valley, both of CA (US)

(73) Assignee: Datron/Transco Inc., Simi Valley, CA (US)

( * ) Notice: Subject to any disclaimer, the term of this patent is extended or adjusted under 35 U.S.C. 154(b) by 0 days.

(21) Appl. No.: 09/568,062

(22) Filed: May 10, 2000

Related U.S. Application Data

(60) Provisional application No. 60/113,525, filed on Dec. 22, 1998.

(51) Int. Cl.[7] .......... H01Q 19/06

(52) U.S. Cl. .......... 343/911 L; 343/754; 343/757; 343/766

(58) Field of Search .......... 343/911 L, 911 R, 343/753, 754, 757, 758, 763, 765, 766; H01Q 15/08, 19/06

(56) References Cited

U.S. PATENT DOCUMENTS

| | | | |
|---|---|---|---|
| 4,255,751 | 3/1981 | Goodman, Jr. . | |
| 4,268,831 | 5/1981 | Valentino et al. | 343/754 |
| 4,531,129 | 7/1985 | Bonebright et al. | 343/754 |
| 4,769,646 | 9/1988 | Raber et al. | 343/753 |
| 5,677,796 | 10/1997 | Zimmerman et al. | 343/911 L |
| 6,018,316 | 1/2000 | Rudish et al. | 342/361 |
| 6,169,525 * | 1/2001 | Dziadek et al. | 343/911 L |

* cited by examiner

*Primary Examiner*—Hoanganh Le
(74) *Attorney, Agent, or Firm*—Edward A. Sokolski

(57) ABSTRACT

A Luneberg lens has a plurality of feeds arranged to send and receive signals to and from a plurality of satellites. The lens is spherical and is fixedly supported on a support mount. Also supported on this mount are a plurality of arcuate positioner tracks which form arcs parallel to the surface of the lens. Each of the feeds is mounted on a separate one of these tracks. The tracks are supported on the mount for separate pivotal motion along separate paths equidistant from the surface of the lens about a "y" axis relative to the lens. A motor is coupled to the drive of each of the tracks to pivotally drive its associated track in response to control signals. The feeds are mounted on the tracks for motion in paths about an "x" axis relative to the lens, such paths being equidistant from the surface of such lens. A motor drives each of the feeds in response to control signals along separate paths parallel to the lens surface. The feeds thus can be separately positioned about the lens surface along mutually orthogonal paths in response to control signals over a wide range. This facilitates continuous communication as the direction of a satellite from the site changes by utilizing two satellites simultaneously so that when one goes out of sight, the other can be used to continue communications.

7 Claims, 4 Drawing Sheets

LUNEBERG LENS ANTENNA WITH MULTIPLE GIMBALED RF FEEDS

Priority is claimed based on Provisional Application No. 60/113,525 filed Dec. 22, 1998.

BACKGROUND OF THE INVENTION

1. Field of the Invention

This invention relates to antennas utilizing Luneberg lens in conjunction with a plurality of feeds for communicating with satellites and more particularly to a device for separately positioning each of the feeds relative to the lens.

2. Description of the Related Art

The use of a Luneberg lens in conjunction with multiple feeds for communicating with satellites is well known in the art. Luneberg lenses which have an arcuate surface and are either spherical or cylindrical to provide wide angle scanning. With a point source located on the surface of the lens the lens transforms the spherical wave into a plane wave with the propagating vector aligned along the diameter of the lens passing through the feed point.

The use of a Luneberg lens has the advantage of providing a wide field of view. In addition, a single such lens can be utilized with a plurality of feeds, each arranged relative to the lens to simultaneously provide communication with a satellite at a different angle from the communications site. Thus, when one satellite disappears from view, the other can be utilized to continue communications.

The use of a Luneberg lens with a plurality of feeds for use in a radar system is described in U.S. Pat. No. 4,531,129 issued Jul. 23, 1985 to Bonebright, et al. In this system, a single axis of movement for a plurality of feeds is described. There is no suggestion of motion of these feeds about a second axis. This limits the tracking ability of the feeds. In addition, in Bonebright, the Luneberg lens is rotated which requires an additional drive system.

SUMMARY OF THE INVENTION

The system of the present invention uses a Luneberg lens having a plurality of feeds each for simultaneously communicating with a separate satellite at a different orientation relative to the communications site. The lens is fixedly mounted on a support mount. Also mounted on the support mount are a plurality of similar arcuate tracks which run parallel to the surface of the lens. A separate feed is mounted on each of such tracks for positioning on its associated track along an "X" axis relative to the lens. A motor is provided to drive each of the feeds along its track to any position therealong in response to control signals. The tracks are mounted for pivotal motion movement along a "y" axis relative to the lens and are each separately driven by a motor in response to control signals to any position along this axis.

The feeds thus can each be separately positioned to a location along mutually orthogonal paths to track a separate satellite in response to control signals. Communication with separate satellites can be achieved simultaneously so that when one satellite goes out of sight, communication is not interrupted but continued through another satellite.

It is therefore an object of this invention to provide an improved satellite communications system.

It is a further object of this invention to enable the continuous communication through satellites by employing a Luneberg lens having a plurality of feeds which are separately positionable about "x" and "y" axes relative to the lens.

Other objects of the invention will become apparent in view of the following description taken in connection with the accompanying drawings.

DETAILED DESCRIPTION OF THE INVENTION

Figure 1:
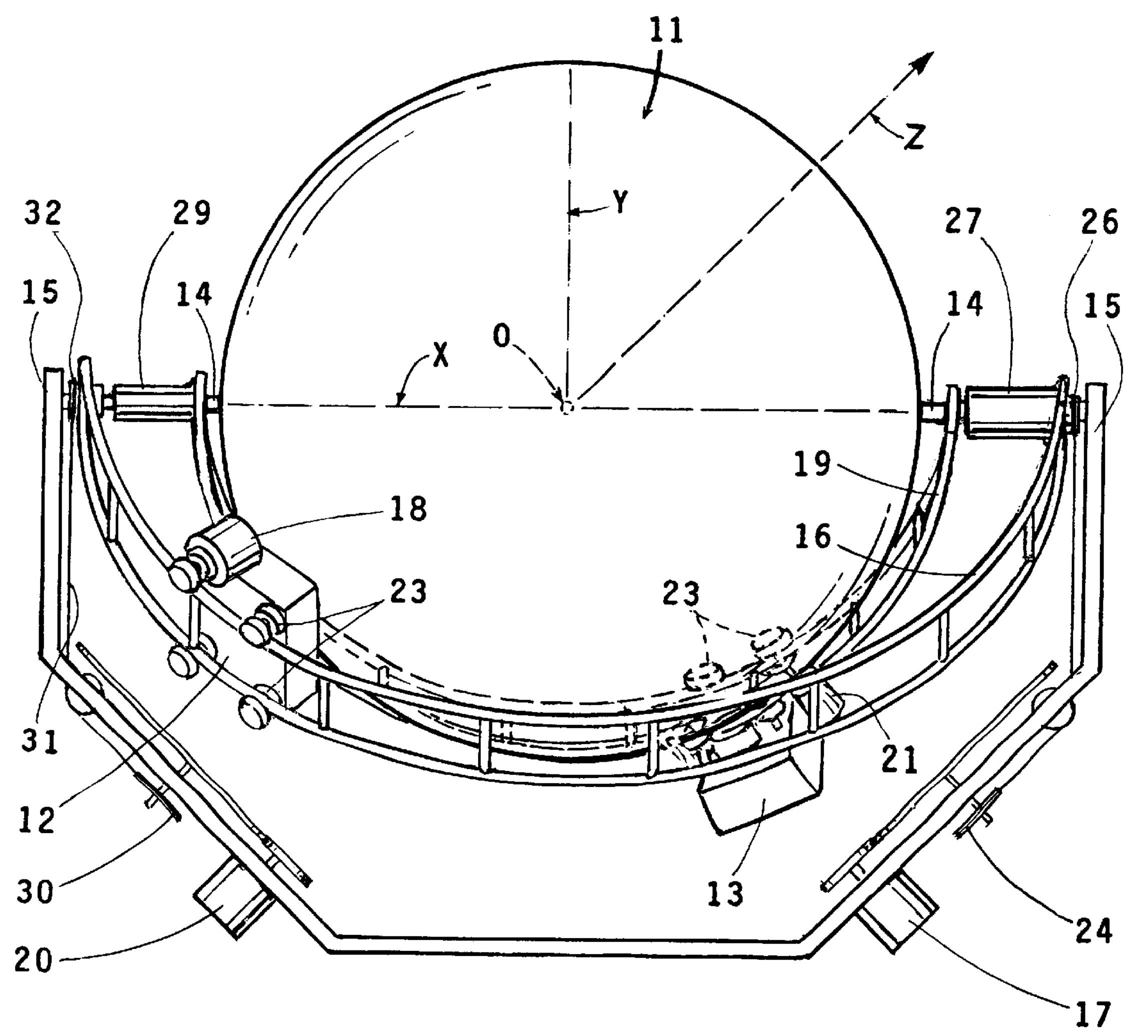
FIG. 1 is a front perspective view of a preferred embodiment of the device of the invention.
Figure 2:
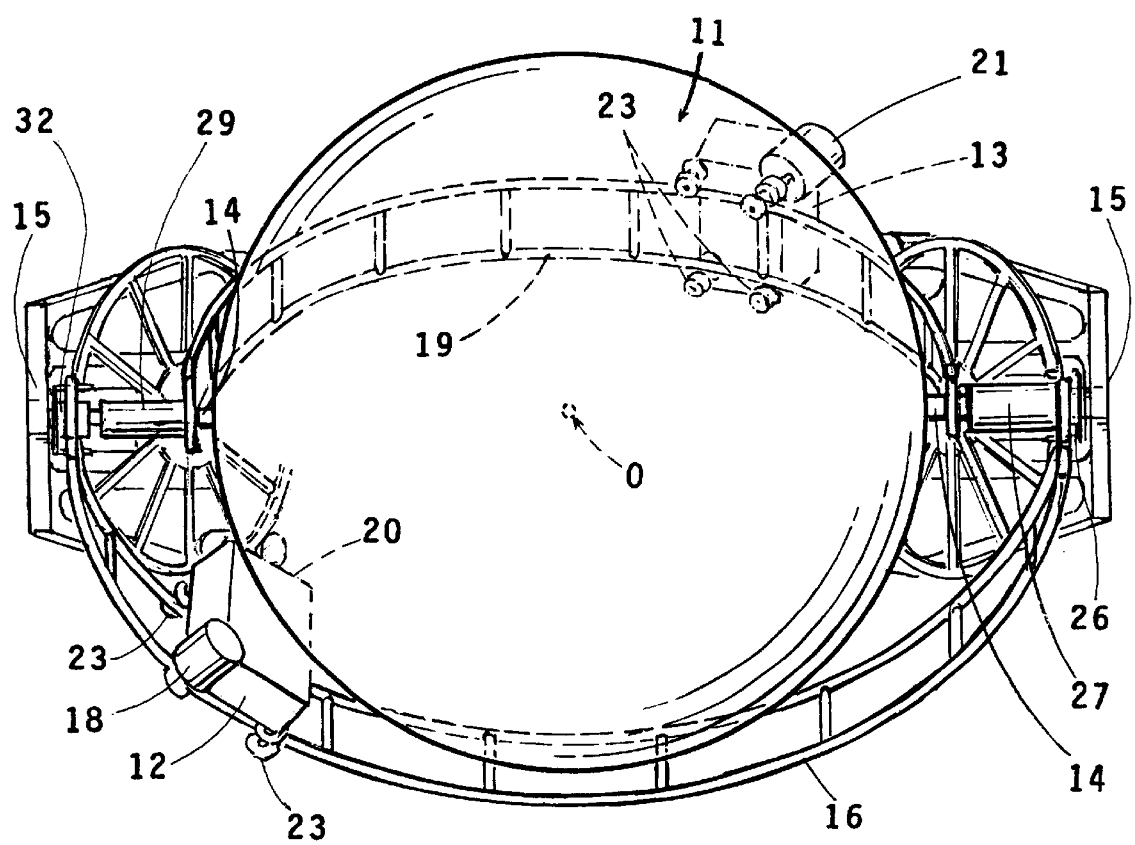
FIG. 2 is a top perspective view of the preferred embodiment.
Figure 3:
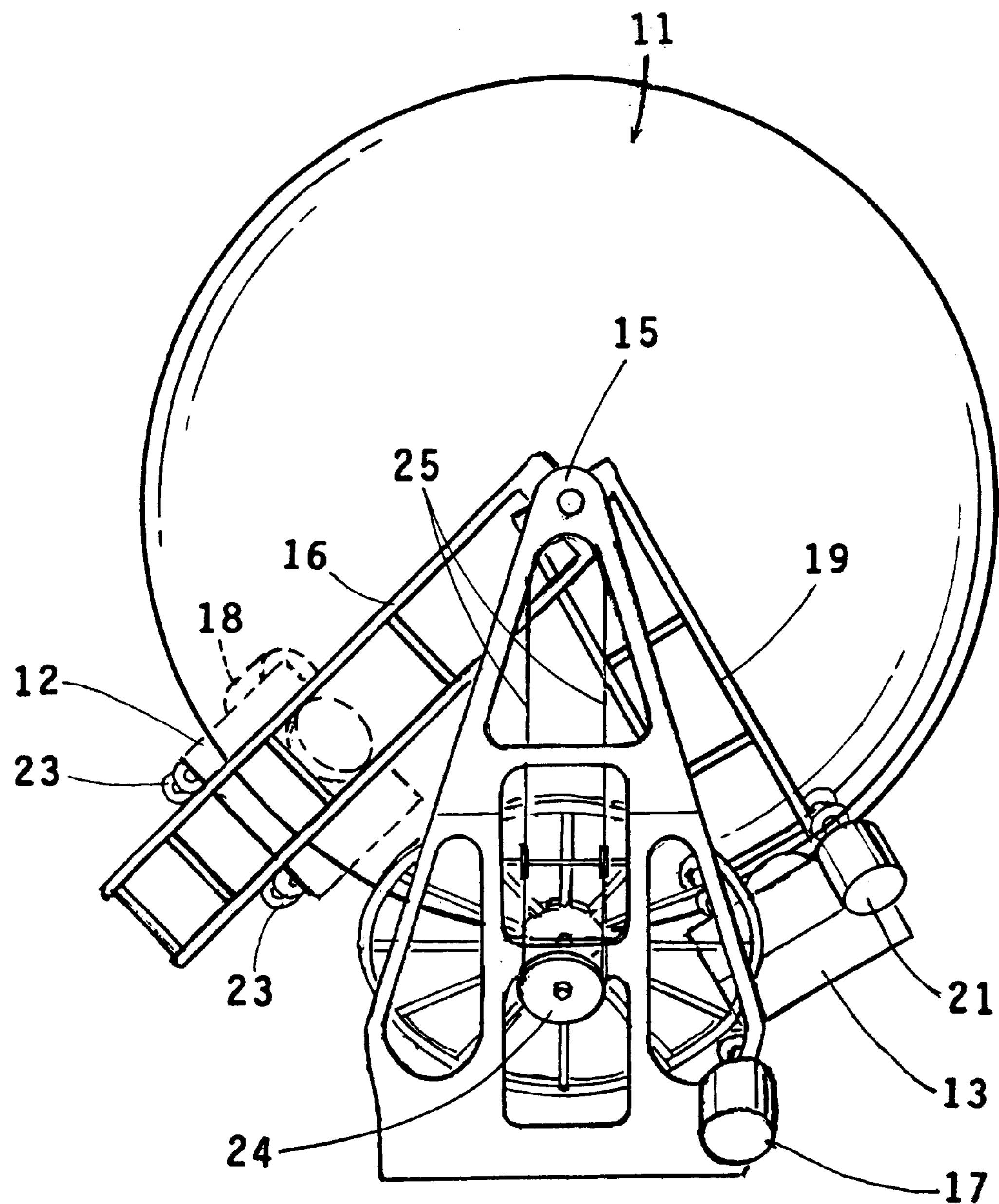
FIG. 3 is a side perspective view of the preferred embodiment.
Figure 4:
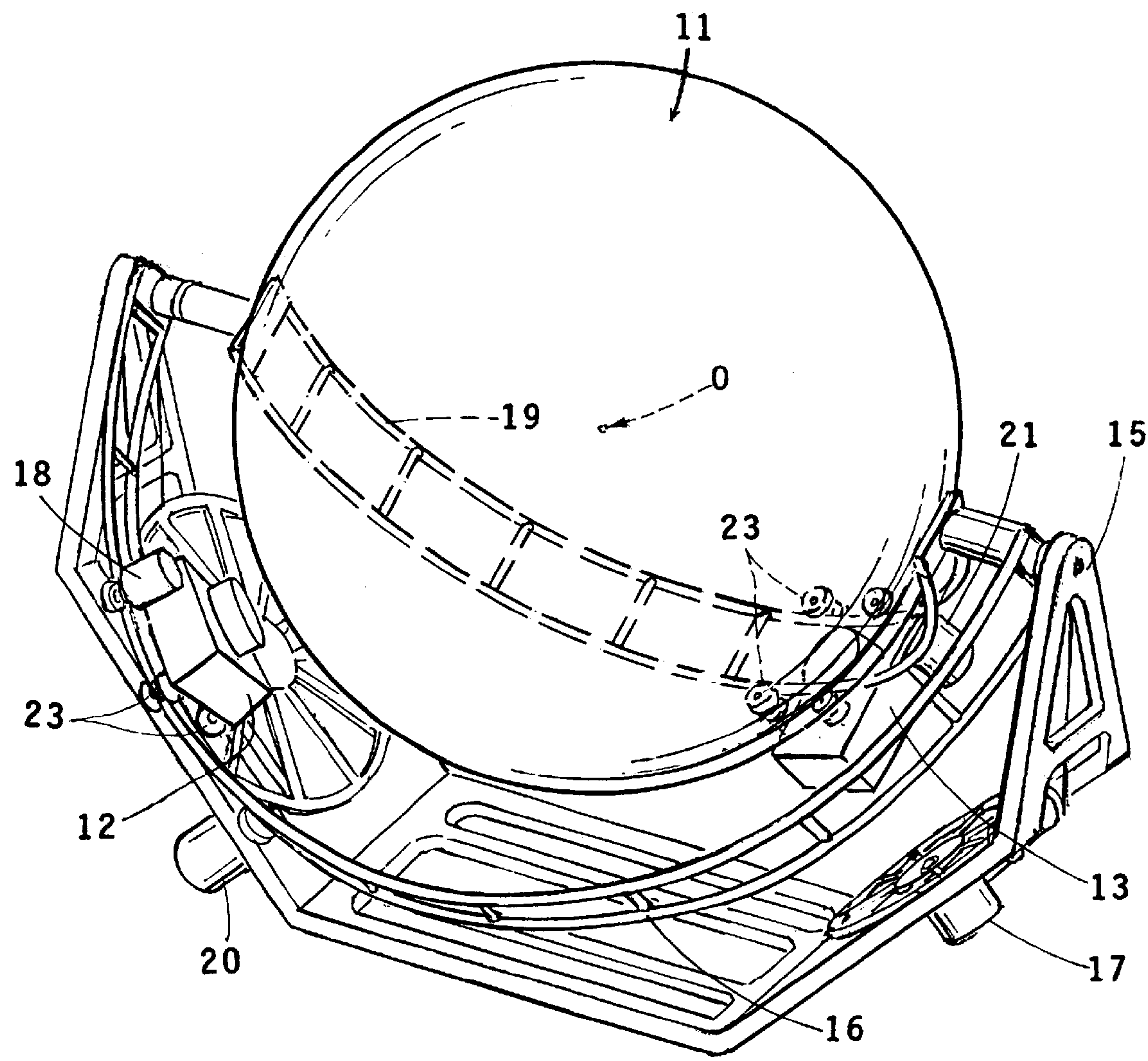
FIG. 4 is an isometric perspective view of the preferred embodiment.

Referring now to the Figures, a preferred embodiment of the invention is illustrated.

Spherical Luneberg lens 11 is fabricated of a dielectrically non homogeneous material with the dielectric constant varying from 2 at its center to 1 at the RF feed interface along its surface. The lens is fixedly supported on support mount 15 by means of posts 14 which are fixedly attached to support arms 15 of the mount. The lens could also be held in place by a post or other support from underneath to minimize signal blockage, if so required. RF feeds 12 and 13 operate to receive or transmit either linearly or circularly polarized signals focussed from the lens, these signals being amplified and converted to an intermediate frequency(IF)) by techniques well known in the art. Additional RF feeds can be employed, this depending on the application involved. The two feeds 12 and 13 are mounted in mutually orthogonal relationship on tracks 16 and respectively. The feeds are supported for motion along their associated tracks by means of wheels 23 which engage the tracks and are capable of rolling therealong. Feed 12 is driven along track 16 by means of motor 18 in response to a control signal while feed 13 is driven by means of motor 21 in response to a separate control signal along its associated track 19. The two feeds are thus positioned as may be required along a curved "X" path opposite the surface of the Luneberg lens.

The two feeds are separately positioned along a curved "Y" path (normal to the "X" path) by means of motors 17 and 20 which are each driven in response to a separate control signal.

Motor 17 rotatably drives pulley wheel 24 which in turn drives pulley line 25. Line 25 drives shaft 26 which is rotatably mounted on post 14 and fixedly attached to sleeve 27 which is also mounted for rotation on post 14. The opposite end of track 16 is fixedly attached to sleeve 29 which is mounted for rotation on post 14. The track 16 is fixedly attached to shaft 26 and rotates therewith. Thus, the motor drives track 16 vertically(along a "Y" axis) about lens 11 in response to a control signal fed to the motor. Track 19 is similarly driven by motor 20 which drives pulley wheel 30 and through line 31 drives shaft 32 which is fixedly attached to one end of the track and mounted for rotation on post 14. The opposite end of track 19 is rotatably supported on post 14. Thus, each of the tracks can be independently driven vertically and horizontally( along "X" and "Y" axes) in response to control signals.

The feeds thus can be separately positioned for communication with different satellites or other sites along different axes "Z" running from the center of the lens "O" such that continuous communication can be maintained when one of the satellites disappears from line of sight. The antenna system of the invention can also be utilized in conjunction with additional tracks and feeds for additional satellite communications utilizing a single Luneberg lens. This antenna system could also be used in conjunction with a radar system.

While the invention has been described and illustrated in detail, this is intended by way of illustration and example only, the scope of the invention being limited by the terms of the following claims.

We claim:

1. An antenna system for use in sending radio signals and receiving signals from a plurality of different sites comprising:

a lens having an arcuate surface, means for supporting said lens, a plurality of radio frequency feeds, means for supporting said feeds opposite said lens in proximity to the surface thereof at various positions thereabout, and means for positioning each of said feeds along mutually orthogonal curved "X" and "Y" paths about the surface of said lens, whereby said feeds are positionable about the surface of said lens to provide simultaneous communication with different sites located along axes at different angles from the center of said lens.

2. The system of claim 1 wherein said lens is a Luneberg lens.

3. The antenna system of claim 1 wherein said means for supporting said lens comprises a mount on which the lens is fixedly supported.

4. The antenna system of claim 3 wherein the means for supporting each of said feeds comprises a separate track for each feed, each of said tracks being pivotally supported on said mount for motion along said "Y" path, separate motor means for driving each of said feeds to positions along said "Y" path, and separate motor means for driving each of said feeds along its associated track to positions along said "X" path.

5. An antenna system for use in simultaneously communicating with a plurality of different sites comprising:

a support mount, a Luneberg lens fixedly supported on said mount, a plurality of tracks, a plurality of radio frequency feeds, each of said feeds being mounted on a separate one of said tracks for motion therealong, said tracks being pivotally supported on said mount opposite and in close proximity to said lens along a curved "X" path opposite the surface of the lens, a separate motor for driving each of said feeds along its associated track in response to control signals, and a separate motor for driving each of said tracks along a "Y" path normal to said "X" path opposite the surface of said lens in response to control signals, whereby said feeds can be positioned to each communicate simultaneously with a separate one of said sites, each site being along an axis at a different angle from the center of said lens.

6. The system of claim 5 and further including pulley drives coupled between said motors and the associated tracks.

7. The system of claim 5 wherein said sites comprise satellites.

* * * * *